United States Patent [19]

Taka et al.

[11] Patent Number: 4,913,977
[45] Date of Patent: Apr. 3, 1990

[54] LOW TEMPERATURE HEAT SHRINKABLE FILM

[75] Inventors: Toshio Taka, Fujisawa; Kihachi Shishido; Takuo Ohkubo, both of Yokohama, all of Japan

[73] Assignee: Showa Denko Kabushiki Kaisha, Tokyo, Japan

[21] Appl. No.: 306,228

[22] Filed: Feb. 3, 1989

Related U.S. Application Data

[62] Division of Ser. No. 897,691, filed as PCT JP84/00588 on Dec. 13, 1984, published as WO86/03452 on Jun. 19, 1986, abandoned.

[51] Int. Cl.$^4$ .............................................. B32B 27/08
[52] U.S. Cl. .................................... 428/516; 428/34.9
[58] Field of Search ............................. 428/516, 34.9; 526/348.1

[56] References Cited

U.S. PATENT DOCUMENTS

| | | | |
|---|---|---|---|
| 4,243,619 | 1/1981 | Fraser et al. | 526/348.6 |
| 4,258,166 | 3/1981 | Canterino et al. | 526/348.1 |
| 4,668,752 | 5/1987 | Tominari et al. | 526/348.6 |

FOREIGN PATENT DOCUMENTS 56-166024 12/1981 Japan.
58-119827 7/1983 Japan.

*Primary Examiner*—Edith Buffalow
*Attorney, Agent, or Firm*—Sughrue, Mion, Zinn, Macpeak & Seas

[57] ABSTRACT

The present invention provides a low temperature heat shrinkable film comprising a linear low density polyethylene resin having a short branched chain and a density of 0.935 g/cm$^3$, and whose film properties are such that the haze value is 5% or less, the heat shrinkages at 90° C. in the M and T directions are 30% or more and 5% or less, respectively, and the shrinkage stress at 90° C. in the M direction is 300 g/mm$^2$ or more. This transparent film having an excellent low temperature heat shrinkability can be produced by drawing a film of the above-mentioned polyethylene resin between two rolls having a diameter of 200 mm or less at an air gap of 10 mm or less at a draw ratio of 3.0 to 6.0. Further, an inflation film having a multilayer structure can be obtained by press bonding or press bonding and drawing a plurality of films comprising the above-mentioned polyethylene resin. This laminate film has an excellent transparency and strength, and has a uniform film thickness.

4 Claims, No Drawings

LOW TEMPERATURE HEAT SHRINKABLE FILM

This is a division of application Ser. No. 897,691, filed as PCT JP 84/00588 on Dec. 13, 1984, published as WO86/03452 on Jun. 19, 1986, now abandoned.

BACKGROUND OF THE INVENTION

The present invention relates a low temperature heat shrinkable film and a process for producing the same. More specifically, the present invention relates to a low temperature heat shrinkable film which has high heat shrinkability at low temperature and high shrinkage stress and which has a remarkably excellent transparency as compared with conventional shrink films, and process for producing such a film. Moreover, the present invention relates to an inflation film consisting of a multilayer structure of a single resin.

Conventionally, there have been used low temperature heat shrinkable films exhibiting a low temperature shrinkability at 90° to 100° C. of 30 to 50% which are obtained by drawing a low density polyethylene resin (LDPE) having a long branched chain usually called high-pressure polyethylene, or a blend of the low density polyethylene resin with an ethylene-vinyl acetate copolymer, a butene type rubber or he like at a draw ratio of 1.5 to 3.0.

However, these films are disadvantageous in that, because the LDPE having a number of long branched chains has a remarkably inferior stretchability, it can be drawn only at a low draw ratio and it cannot be uniformly drawn, with the result that unevenness in drawing is generated in the resultant film and unevenness in thickness or jetting are generated in the film due to the internal strain remaining in the film. Therefore, there are serious problems with regard to the productivity of these films. Further, these films have another disadvantage in that they cannot exhibit a display effect to a sufficient degree because the haze value indicative of the transparency of the film, which is a very important factor in a packaging film, is 5% or more, typically about 10%.

The present inventors made extensive investigations to improve the above-mentioned defects. As a result, the present inventors discovered that when a film made of a linear low density polyethylene resin having a short branched chain and density of 0.935 g/cm$^3$ or less (hereinafter referred to as LLDPE) was drawn at a draw ratio of 3.0 to 6.0 between two rolls having a diameter of 200 mm or less using an air gap of 10 mm or less, a low temperature shrinkable film could be produced which had an extremely excellent transparency, was free from unevenness in drawing, and had a uniform thickness and an excellent film strength.

As is well known, an inflation method is one method for forming plastics films. This inflation method generally comprises blowing air into a tube extruded from an inflation die attached to an extruder to expand the tube, and cooling the expanded tube, thereby continuously forming a plastics film.

When a film is produced by means of an inflation method, in order to prevent the films in the form of a tube from being blocked, the addition of an antiblocking agent is carried out or other measures are adopted.

In the course of extensive investigations to develop a low temperature heat shrinkable polyethylene film having excellent transparency and excellent properties which is suitable for use in shrink packaging, the present inventors discovered that, when a linear low density polyethylene resin having a short branched chain and a density of 0.935 g/cm$^3$ or less was formed into a film in the form of a tube by means of an air cooling inflation method or a water cooling inflation method, and two films were allowed to be strongly blocked by a strong nip-roll pressure, while effecting sufficient cooling and folding the tubular film by means of a guide plate, in contrast with the conventional technique in which blocking of films is avoided as much as possible, so as to form a two layer structured film, the tubular film could be easily blocked by forming the above-mentioned polyethylene resin according to a water cooling inflation method, a two-stage air cooling inflation method and other methods which exhibit an excellent cooling efficiency because the polyethylene resin has a remarkable tendency to be blocked by a rapid cooling method having a high cooling efficiency in an inflation forming method.

Moreover, it was discovered that when the film obtained above was drawn by means of heat rolls, the blocking of the two films was further strengthened so as to obtain a drawn film of two layer structure which could not be readily separated into two pieces, and at the same time, the transparency was rapidly enhanced to a high level equal to that of a vinylon film (haze value: 3% or less).

In addition, since the above-mentioned drawn film was of a two layer structure in which the two films were blocked, it was found that the film strength such as impact strength and tear strength, especially longitudinal tear strength, was remarkably excellent. As shown in the comparative examples described hereinafter, it was also found that the drawn film exhibited remarkably excellent impact strength and tear strength as compared with an inflation film or a T-die film of single structure having the same thickness. When the strength of a film is to be enhanced, it is a common practice to increase the thickness of the film. In this case, the transparency of the film is likely to be decreased. In contrast, it was found in the above-mentioned case that the transparency became rather improved. As described hereinabove, the conventional low temperature heat shrinkable film was disadvantageous in that the thickness was uneven, the jetting was generated, the quality of the product was poor, and the transparency of the film was unsatisfactory. The present inventors succeeded in obtaining a film of multilayer structure which was heat shrinkable at a lower temperature, had a remarkably excellent transparency and exhibited a conspicuously excellent strength, especially a high resistance to longitudinal tearing, as compared with the conventional inflation films and the like, by press bonding or press bonding and drawing a plurality of films composed of a linear polyethylene resin having a short branched chain and a density of 0.935 g/cm$^3$ or less by means of an inflation method so as to provide a laminated film.

GIST OF THE INVENTION

The low temperature heat shrinkable film according to the present invention is characterized in that it comprises a linear low density polyethylene having a short branched chain and a density of 0.935 g/cm$^3$ or less, the haze value is 5% or less, the heat shrinkages at 90° C. in the M and T directions are 30% or more and 5% or less, respectively, and the shrinkage stress at 90° C. in the M direction is 300 g/mm$^2$ or more. This film can be produced by drawing the above-mentioned linear low density polyethylene resin between two rolls having a diameter of 200 mm or less at an air gap of 10 mm or less at a draw ratio of 3.0 to 6.0.

The multilayer structure inflation film according to the present invention is formed by laminating a plurality of films comprising a linear low density polyethylene resin having a short branched chain and a density of 0.935 g/cm$^3$ or less.

DETAILED DESCRIPTION OF THE INVENTION

In accordance with the present invention, instead of the conventional high-pressure polyethylene, a linear low density polyethylene resin having a short branched chain and a density of 0.935 g/cm$^3$ or less (LLDPE) which can be uniformly drawn at a high draw ratio (e.g., 3 to 6) is used as the starting material. Further, even if the LLDPE is shaped into a film while being cooled to a sufficient degree by means of the two-stage air cooling inflation method, a water cooling inflation method, a chill roll method or the like, the resultant film has excellent transparency and a satisfactory thickness. In addition, by uniformly drawing the film at about 90° C. at a high draw ratio (3 to 6) in the M direction, it is possible to obtain a film having remarkably excellent transparency (the haze value is 5% or less).

Moreover, the low temperature heat shrinkable film of the present invention has very excellent characteristics in that the heat shrinkages at 90° C. in the M and T directions are 30% or more and 5% or less, respectively, and the shrinkage stress at 90° C. in the M direction is 300 g/mm$^2$.

The LLDPE usable in the present invention can be produced by subjecting ethylene and at least one α-olefins having from 3 to 12 carbon atoms (e.g., propylene, butene-1, hexene-1, 4-methyl-1-pentene, octene-1 and decene-1) to a conventional medium low-pressure method or a high-pressure method in the presence of a Ziegler catalyst. The medium low-pressure method includes a gas phase method, a slurry method or a solution method.

The LLDPE used in the present invention may be blended with an ethylene-vinyl acetate copolymer, a butene rubber, high-pressure low density polyethylene having a long branched chain or the like.

The LLDPE used in the present invention has a density of 0.935 g/cm$^3$ or less, preferably 0.900 to 0.930 g/cm$^3$. If the density is more than 0.935 g/cm$^3$ a satisfactory low temperature heat shrinkability cannot be obtained.

Although the melt index (MI) of the LLDPE is not especially limited, it is preferable that the MI be 0.3 to 8 g/10 min (measurement condition: according to JIS K 6760), more preferably 0.5 to 3 g/10 min. If the MI is less than 0.3 g/10 min, melt fracture is likely to occur resulting in a film of poor quality. On the other hand, an MI exceeding 8 g/10 min tends to cause the resultant film to exhibit undesirably decreased strength. The LLDPE used in the present invention is not especially limited with regard to the molecular weight distribution. However, it is preferable to use the LLDPE having a narrow molecular weight distribution in order to further improve the quality, especially transparency, of the resultant film. It is particularly preferable that the $M_W/M_n$ value ($M_W$: weight average molecular weight by GPC measurement, $M_n$: number average molecular weight by GPC measurement), which is a measure of the molecular weight distribution, be in the range of from 3.0 to 5.0.

As described hereinabove, in accordance with the present invention, the use of the above-mentioned specific LLDPE makes it possible to increase the draw ratio of the film to a level of 3.0 to 6.0 and to obtain a uniform film having no unevenness in thickness due to uniform drawing. That is, a high draw ratio of 3 or more can be used. As a result, the resultant film has a drastically improved transparency. If the draw ratio is less than 3.0, a large unevenness in drawing is generated resulting in an unevenness in thickness, and further the transparency is poor. On the other hand, a draw ratio exceeding 6.0 tend to cause drawing breakage making stable production difficult. Therefore, it is difficult to obtain a film having the desired film properties according to the present invention.

Since the polyethylene resin film used in the present invention has the property of undergoing high necking, in order to obtain a film having a uniform thickness, it is necessary that the two rolls used for the drawing should have a diameter of 200 mm or less, preferably 80 to 180 mm, the air gap should be 10 mm or less, preferably 3 to 5 mm, and the draw ratio should preferably be 3.0 to 6.0, as described hereinabove. The term "air gap" as used herein refers to a distance from a point of contact at which the film is first separated from a low speed roll after the passage thereon to a point at which the film then comes into contact with a high speed roll between the low and high speed rolls. If the diameter of the drawing roll is more than 200 mm, the necking of the film becomes undesirably large. Further, if the air gap between the two drawing rolls is more than 10 mm, the necking of the film becomes undesirably large.

In the production of the low temperature heat shrinkable film according to the present invention, the drawing temperature is not especially limited. However, for the purpose of attaining the object of the present invention, it is preferable that the drawing temperature be 70° to 110° C., more preferably 80° to 100° C. The use of such a drawing temperature makes it possible to attain an excellent low temperature heat shrinkability.

The low temperature heat shrinkable film according to the present invention also may be shaped by a conventional air cooling inflation method in which air is blown onto the circumference of an extruded tube and then a film in the form of a tube is shaped while spontaneously cooling the tube. However, it is preferable to use a shaping method capable of providing sufficient cooling. The use of a water cooling inflation method in which a tube is cooled while being brought into direct contact with water, a chill roll method using a cooling roll (chill roll), which methods are used as a conventional rapid cooling method, and the like, makes it possible to obtain a film having a further improved transparency.

Conventionally, a film having an extremely excellent transparency and excellent low temperature shrinkability has not been made from a polyethylene resin. Such a film has been made from polyvinyl chloride (PVC), drawn polypropylene (PP) and the like. However, the film of the present invention is a polyethylene film having an excellent transparency and heat shrinkability equal to those of a PVC or drawn pp film while the excellent characteristics (low temperature heat sealability, flexibility, food safety, and the like) of the polyethylene are retained.

The inflation film according to the present invention can be obtained by press bonding a tubular film comprising the LLDPE as described hereinabove. The press bonded film is preferably drawn. In accordance with the present invention, by such press bonding, a film having a large sheet thickness can be readily obtained. For example, a 200 μ thick film (sheet) is easily obtained from a tubular film one side of which has a thickness of 100 μ. Further, the resultant film has an excellent transparency in spite of its thickness. A tubular film also may be obtained by a conventional air cooling inflation method. However, it is preferable to use a method in which the efficiency of cooling is high, e.g., a water cooling inflation method or a two stage air cooling inflation method. Sufficient cooling cannot only provide a tubular film having an excellent transparency but also can make blocking of the tubular film in the subsequent step easy. The tubular film is folded by means of a guide plate and then the two films are strongly press bonded under a strong nip roll pressure, e.g., 4 to 5 kg/cm$^2$. The above-mentioned blocking also depends on the distance between the die and the nip rolls. Therefore, this distance is suitably adjusted. When the tubular film is rapidly cooled and is passed through between the nip rolls as rapidly as possible after the cooling, the blocking is strengthened. Thus, a two layer structure inflation film is obtained. The drawing is preferably carried out by, for example, monoaxially drawing the above-obtained press-bonded film between two rolls having a dimension of 200 mm or less at an air gap of 10 mm or less.

As described hereinabove, the draw ratio can be made higher than that for the conventional high-pressure polyethylene resin. When the draw ratio if less than 3.0, a large unevenness in drawing occurs resulting in an unevenness in thickness. Further, the transparency becomes poor. On the other hand, when the draw ratio is more than 6.0, drawing breakage is likely to occur making stable production difficult. Therefore, it is preferable that the draw ratio be suitably selected within the range of from 3.0 to 6.0.

In addition, the drawing temperature is preferably in the range of from 70° C. to 100° C. in terms of roll temperature. Especially the drawing temperature in the range of from 80° C. to 100° C. provides an excellent low temperature shrinkability.

EXAMPLES

The present invention will now be explained by examples and comparative examples. It is to be understood that these examples by no means limit the scope of the present invention. In the examples and comparative examples, the used physical properties were determined by the following method.

(1) Haze value (%): ASTMD-1003
(2) Impact strength (kg/mm): pendulum type, impactor=1 inch hemisphere
(3) Tear strength (kg/cm): JIS Z 1702
(4) Heat shrinkage (%): JIS Z 1709 (90° C.)
(5) Shrinkage stress (g/mm$^2$): The shrinkage tension is recorded at a heating ratio of 3° C./min using a tension (provided with a temperature-elevating and dropping vessel).

Materials
Film 50 mm wide, chuck gap 100 mm (in the form of a strip)
Settling

A film 50 mm wide in the form of a strip is set at a tension of 0 to the tension in which the chuck gap is set at 100 mm.

The atmosphere temperature is raised from normal temperature at a heating rate of 3° C./min, and the shrinkage tension generated at each temperature is divided by the cross-sectional area of the original film. The thus-obtained value is expressed as the shrinkage stress.

(6) Unevenness is thickness: A film is slit 20 mm from both sides (edges), and the thickness in the control direction of the remaining film is determined. Then, the percentage of R (the maximum thickness—the minimum thickness) based on the average thickness is determined.

EXAMPLE 1

A linear low density polyethylene resin having a short branched chain and a density of 0.917 g/cm$^3$ was used and the resin was subjected to an air cooling inflation method. The resultant tubular film was sufficiently cooled to obtain a film having excellent transparency. The film was drawn at a draw ratio of 3.5 at a drawing temperature of 90° C. in the M direction to obtain a drawn film (40 μ thick). The measurement results of the physical properties of the drawn film are shown in Table 1.

EXAMPLES 2 to 3

A drawn film was obtained according the same procedures as those described in Example 1 except that the resin indicated in Table 1 was used. The results are shown in Table 1.

However, in Example 3, a water cooling inflation method was carried out.

COMPARATIVE EXAMPLE 1

A drawn film (40 μ thick) was obtained according to the same manner as that described in Example 1 except that a high-pressure LDPE having a density of 0.921 g/cm$^3$ was used. However, when the drawing was carried out at the same draw ratio of 3.5 as in Example 1, drawing breakage occurred. Therefore, the draw ratio was set at 2.2. The results are shown in Table 1.

COMPARATIVE EXAMPLE 2

A film was obtained in the same manner as in Comparative Example 1 except that no drawing was carried out. The results are shown in Table 1.

COMPARATIVE EXAMPLE 3

A drawn film was obtained in the same manner as in Comparative Example 1 except that PVC having a density of 1.35 g/cm$^3$ was used. The results are shown in Table 1.

COMPARATIVE EXAMPLE 4

A film was obtained in the same manner as in Comparative Example 3 except that no drawing was carried out. The results are shown in Table 1.

COMPARATIVE EXAMPLE 5

A drawn film was obtained in the same manner as in Comparative Example 1 except that PP having a density of 0.900 g/cm$^3$ was used. The results are shown in Table 1.

TABLE 1

| Item | | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|
| Resin used | | LLDPE | same as on the left | same as on the left | high-pressure LDPE | same as on the left | PVC | PVC | PP |
| Resin density (g/cm$^3$) | | 0.917 | 0.928 | 0.932 | 0.921 | same as on the left | 1.35 | 1.35 | 0.900 |
| Melt index (g/10 min) | | 0.6 | 1.0 | 1.0 | 1.5 | 1.5 | 2 | 2 | 2 |
| Molecular weight distribution (Mw/Mn) | | 3.2 | 3.5 | 3.5 | 6 | 6 | — | — | — |
| Diameter of drawing roll (mm) | | 80 | 100 | 100 | 100 | — | 100 | — | 100 |
| Air gap (mm) | | 3 | 5 | 5 | 5 | — | 5 | — | 5 |
| Draw ratio | | 3.5 | same as on the left | same as on the left | 2.2 | — | 3.5 | — | 3.5 |
| Drawing temperature (°C.) | | 90 | 90 | 90 | 90 | — | 90 | — | 90 |
| Film properties | Thickness (μ) | 40 | 40 | 40 | 40 | 40 | 40 | 40 | 40 |
| | Haze (%) | 2.2 | 2.5 | 2.4 | 8.5 | 9.5 | 2.2 | 2.4 | 2.5 |
| | Impact strength (kg · cm/mm) | 1100 | 1600 | 950 | 280 | 200 | 680 | 400 | 800 |
| | Heat shrinkage at 90° in the M direction (%) | 38 | 35 | 32 | 33 | 0 | 34 | 3 | 12 |
| | Heat shrinkage at 100° C. in the M direction (%) | 55 | 50 | 46 | 45 | 3 | 43 | 6 | 18 |
| | Shrinkage stress at 90° C. in the M direction (g/mm$^2$) | 500 | 460 | 420 | 410 | 0 | 190 | 0 | 200 |
| | Unevenness in thickness | 14 | 16 | 14 | 35 | 22 | 20 | 20 | 24 |
| Remarks | | | | | | | | | |

EXAMPLE 4

A linear low density polyethylene resin film having a short branched chain, a density of 0.917 g/cm$^3$ and a melt index of 0.5 g/10 min was drawn between two drawing rolls having a diameter of 80 mm at an air gap of 3 mm at a draw ratio of 3.5 and a drawing temperature of 80° C. The physical properties of the resultant film (40 μ thick) were determined. The results are shown in Table 2.

EXAMPLE 5 THROUGH 8

A drawn film was obtained in the same manner as in Example 4 except that the resin and conditions indicated in Table 2 were used. The results are shown in Table 2.

COMPARATIVE EXAMPLE 6

A linear low density polyethylene resin having a short branched chain, a density of 0.928 g/cm$^3$ and a melt index of 1.0 g/10 min was drawn between two drawing rolls having a diameter of 250 mm at an air gap of 5 mm at a draw ratio of 4.5 and a drawing temperature of 100° C. The measurement results of the physical properties of the resultant film (40 μ thick) are shown in Table 3.

COMPARATIVE EXAMPLES 7 THROUGH 12

A drawn film was obtained in the same manner as in Comparative Example 6 except that the resin and conditions indicated in Table 3 were used. The results are shown in Table 3.

TABLE 2

| Resin used, drawing conditions | | Example 4 | Example 5 | Example 6 | Example 7 | Example 8 |
|---|---|---|---|---|---|---|
| Resin used | | LLDPE | same as on the left | same as on the left | same as on the left | same as on the left |
| Density (g/cm$^3$) | | 0.917 | 0.917 | 0.928 | 0.928 | 0.934 |
| Melt index (g/10 mm) | | 0.5 | 2.0 | 7.0 | 1.0 | 1.0 |
| Molecular weight distribution Mw/Mn | | 3.2 | 3.5 | 3.7 | 3.5 | 3.5 |
| Diameter of drawing roll (mm) | | 80 | 180 | 100 | 100 | 100 |
| Air gap (mm) | | 3 | 5 | 7 | 5 | 5 |
| Draw ratio | | 3.5 | 4.5 | 5.5 | 4.5 | 4.5 |
| Drawing temperature (°C.) | | 80 | 70 | 90 | 100 | 110 |
| Film physical properties | Thickness | 40 | 40 | 40 | 40 | 40 |
| | Haze (%) | 2.5 | 2.9 | 2.8 | 2.5 | 2.8 |
| | Impact strength (kg · cm/mm) | 1200 | 1000 | 350 | 950 | 750 |
| | Heat shrinkage (%) (M direction, 90° C.) | 42 | 38 | 32 | 35 | 33 |
| | Shrinkage stress (g/mm$^2$) (M direction, 90° C.) | 510 | 480 | 420 | 410 | 420 |
| | Unevenness in thickness (R, %) | 10 | 20 | 18 | 16 | 16 |
| | Remarks | necking of film is small, no drawing breakage | same as on the left | same as on the left | same as on the left | same as on the left |

TABLE 3

| Resin used, drawing conditions | Comparative Example | | | | | | |
|---|---|---|---|---|---|---|---|
| | 6 | 7 | 8 | 9 | 10 | 11 | 12 |
| Resin used | polyethylene resin | same as on the left | same as on the left | same as on the left | high-pressure LDPE | high-pressure LDPE | high-pressure LDPE |
| Density (g/cm³) | 0.928 | 0.928 | 0.928 | 0.928 | 0.920 | 0.920 | 0.920 |
| Melt index (g/10 min) | 1.0 | 1.0 | 1.0 | 1.0 | 0.5 | 2.0 | 2.0 |
| Molecular weight distribution Mw/Mn | 3.5 | 3.5 | 3.5 | 3.5 | 6 | 5.6 | 5.6 |
| Diameter of drawing roll (mm) | 250 | 100 | 100 | 100 | 100 | 100 | 100 |
| Air gap (mm) | 5 | 15 | 5 | 5 | 5 | 5 | 5 |
| Draw ratio | 4.5 | 4.5 | 2.5 | 7.0 | 3.5 | 3.0 | 4.0 |
| Drawing temperature (°C) | 100 | 100 | 100 | 100 | 100 | 70 | 70 |
| Film physical properties — Thickness | 40 | 40 | 40 | — | — | 40 | — |
| Haze (%) | 4.0 | 3.8 | 6.5 | — | — | 7.5 | — |
| Impact strength (kg · cm/mm) | 1000 | 1100 | 420 | — | — | 200 | — |
| Heat shrinkage (%) (M direction, 90° C.) | 38 | 35 | 18 | — | — | 32 | — |
| Shrinkage stress (g/mm²) (M direction, 90° C.) | 510 | 520 | 420 | — | — | 400 | — |
| Unevenness in thickness (R, %) | 40 | 35 | 20 | — | — | 30 | — |
| Remarks | remarkable unevenness in thickness | same as on the left | poor transparency, poor shrinkage | drawing breakage, stable production impossible | breakage due to fusion with roll | poor transparency, remarkable unevenness in thickness | drawing breakage |

EXAMPLE 9

A linear low density polyethylene resin having a short branched chain and a density of 0.917 g/cm³ was used, and the resin was shaped into a film in the form of a tube by a two stage cooling inflation method. The resultant film was passed through between nip rolls at a nip roll pressure of 4.0 kg/cm² to allow the film to be blocked. The resultant film was then drawn at a drawing temperature of 85° C. at a draw ratio of 4.0 to provide a drawn film. The evaluation results of the physical properties of the drawn film are as shown in Table 4.

EXAMPLE 10

A drawn film was obtained in the same manner as in Example 9 except that a linear low density polyethylene resin having a short branched chain and a density of 0.935 g/cm³ was used, the drawing temperature was 90° C. and the draw ratio was 5.0. The results are shown in Table 4.

EXAMPLE 11

A drawn film was obtained in the same manner as in Example 9 except that a linear low density polyethylene resin having a short branched chain and a density of 0.928 g/cm³ was used, a water cooling inflation method was used, the drawing temperature was 75° C., and the draw ratio was 3.5. The results are shown in Table 4.

COMPARATIVE EXAMPLE 13

A drawn film was obtained in the same manner as in Example 9 except that an air cooling inflation method was used, and the tubular film was passed through between the nip rolls at a nip roll pressure of 1.5 kg/cm². The results are shown in Table 4.

COMPARATIVE EXAMPLE 14

A high-pressure LDPE having a density of 0.921 g/cm³ was used, the drawing was carried out under the conditions indicated in Table 4, and an air cooling inflation method was used. Thus, a drawn film was obtained. The results are shown in Table 4.

COMPARATIVE EXAMPLE 15

A high-pressure LDPE having a density of 0.921 g/cm³ was used, the drawing was carried out under the conditions indicated in Table 4 and a T die method was used. Thus, a drawn film was obtained. The results are shown in Table 4.

COMPARATIVE EXAMPLE 16

A drawn film was shaped in the same manner as in Example 11 except that a high-pressure LDPE having a density of 0.921 g/cm³ was used, the drawing temperature was 70° C. and the draw ratio was 3.2. The film was broken due to drawing breakage.

As described hereinabove, in accordance with the present invention, there is obtained a multilayer structured film having low temperature heat shrinkability, remarkably excellent transparency, and conspicuously excellent strength, especially excellent resistance to longitudinal tearing. This film is expected to be used in various applications by using these properties, coupled with the uniformity of the film thickness. For example, the film of the present invention can be used in the packaging field where a vinylon film, a polyvinyl chloride (PVC) film or the like having a high transparency is used, in addition to the shrink film field where low temperature heat shrinkability is utilized.

Moreover, according to the present invention, in addition to a two layer structured inflation film, three or more layer structured inflation films, such as four or six layer structured films, also may be obtained.

in the T direction is 5% or less, and the shrinkage stress at 90° C. in the M direction is 300 g/mm² or more.

TABLE 4

| Item | | Example 9 | Example 10 | Example 11 | Comparative Example 13 | Comparative Example 14 | Comparative Example 15 | Comparative Example 16 |
|---|---|---|---|---|---|---|---|---|
| Resin used | | Present resin LLDPE | same as on the left | same as on the left | same as on the left | LDPE high-pressure | same as on the left | same as on the left |
| Density (g/cm³) | | 0.917 | 0.935 | 0.928 | 0.917 | 0.921 | 0.921 | 0.921 |
| Melt index (g/10 min) | | 0.5 | 1.0 | 1.0 | 0.5 | 1.5 | 1.5 | 1.5 |
| Molecular weight distribution Mw/Mn | | 3.2 | 3.5 | 3.5 | 3.2 | 6 | 6 | 6 |
| Diameter of drawing roll (mm) | | 80 | 100 | 100 | 100 | 100 | 100 | 100 |
| Air gap (mm) | | 3 | 5 | 5 | 5 | 5 | 5 | 5 |
| Shaping method | | two stage air cooling inflation method | same as on the left | water cooling inflation method | air cooling inflation method | same as on the left | T-die method | water cooling inflation method |
| Blocking (nip roll pressure kg/cm²) | | occur (4.0) | occur (4.0) | occur (4.0) | none (1.5) | none (4.0) | none (1.5) | none (1.5) |
| Layer structure of film | | two layer | two layer | two layer | mono-layer | mono-layer | mono-layer | two layer |
| Drawing temperature (°C.) | | 85 | 90 | 75 | 85 | 65 | 70 | 70 |
| Draw ratio | | 4.0 | 5.0 | 3.5 | 4.0 | 2.5 | 2.2 | 3.2 |
| Film physical properties | Thickness ($\mu$) | 40 | 30 | 70 | 40 | 40 | 40 | — |
| | Haze (%) | 2.6 | 2.8 | 1.9 | 5.5 | 7.0 | 5.0 | — |
| | Impact strength (kg·cm/mm) | 1200 | 950 | 1600 | 650 | 350 | 280 | — |
| | Tear strength (MD) (kg/cm) | 140 | 95 | 180 | 35 | 25 | 17 | — |
| | Heat shrinkage (MD, 90° C.) | 41 | 35 | 38 | 32 | 30 | 25 | — |
| | Shrinkage stress (g/mm²) (MD, 90° C.) | 530 | 410 | 460 | 410 | 0 | 0 | — |
| | Unevenness in thickness | 10 | 12 | 14 | 15 | 35 | 10 | — |
| Remarks | | | | | | | | Broken due to drawing breakage |

We claim:

1. A low temperature heat shrinkable film comprising a plurality of laminated films composed of a linear low density ethylene-$C_3$-$C_{12}$-$\alpha$-olefin copolymer resin having a short branched chain and a density of 0.935 g/cm³ or less, and whose film properties are such that the haze value is 2.9% or less, the heat shrinkage at 90° C. in the M direction is 30% or more, the heat shrinkage at 90° C.

2. A film according to claim 1, wherein the linear low density ethylene-$\alpha$-olefin copolymer resin has a density of 0.900 to 0.935 g/cm³.

3. A film according to claim 1, wherein the linear low density ethylene-$\alpha$-olefin copolymer has a melt index of 0.3 to 8 g/10 min.

4. A film according to claim 1, wherein the linear low density ethylene-$\alpha$-olefin copolymer resin has a molecular weight distribution of Mw/Mn of 3.0 to 5.0

* * * * *